(12) United States Patent
Chen et al.

(10) Patent No.: US 7,962,926 B2
(45) Date of Patent: Jun. 14, 2011

(54) METHOD, SYSTEM, AND PROGRAM STORAGE DEVICE FOR GENERATING A RETRY MESSAGE WHEN A THREAD IN A REAL-TIME APPLICATION IS UNAVAILABLE TO PROCESS A REQUEST TO UTILIZE THE REAL-TIME APPLICATION

(75) Inventors: Chiahong Chen, Tucson, AZ (US); Radha Ramachandran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/398,002

(22) Filed: Apr. 5, 2006

(65) Prior Publication Data

US 2007/0239890 A1 Oct. 11, 2007

(51) Int. Cl.
*G06F 3/00* (2006.01)
*G06F 13/00* (2006.01)
(52) U.S. Cl. .................. 719/328; 717/163; 717/164
(58) Field of Classification Search .................. None
See application file for complete search history.

(56) References Cited

U.S. PATENT DOCUMENTS

| | | | | |
|---|---|---|---|---|
| 5,764,915 | A * | 6/1998 | Heimsoth et al. | 709/227 |
| 6,427,161 | B1 * | 7/2002 | LiVecchi | 718/102 |
| 7,594,022 | B2 * | 9/2009 | Warren et al. | 709/229 |
| 2003/0233465 | A1 * | 12/2003 | Le et al. | 709/231 |
| 2004/0019661 | A1 | 1/2004 | Eleftheriou et al. | |
| 2004/0117453 | A1 | 6/2004 | Cheng et al. | |
| 2004/0199649 | A1 | 10/2004 | Tarnanen et al. | |
| 2005/0066327 | A1 | 3/2005 | Dettinger et al. | |
| 2005/0086349 | A1 * | 4/2005 | Subramaniyan | 709/230 |
| 2005/0119988 | A1 | 6/2005 | Buch et al. | |

* cited by examiner

*Primary Examiner* — Andy Ho
*Assistant Examiner* — Shih-Wei Kraft
(74) *Attorney, Agent, or Firm* — Griffiths & Seaton PLLC

(57) ABSTRACT

A method, system and program storage device for preventing a real-time application from running out of free threads when the real-time application receives a device interface request. A set of special data packets for the main user application is provided. Shared functions are provided as part of the device interface to indicate the error condition when there is no more free thread and for a utility program to recognize a retry is needed. Thus, the retry mechanism is embedded in the shared functions running on both the main user application and all utility programs.

12 Claims, 8 Drawing Sheets

METHOD, SYSTEM, AND PROGRAM STORAGE DEVICE FOR GENERATING A RETRY MESSAGE WHEN A THREAD IN A REAL-TIME APPLICATION IS UNAVAILABLE TO PROCESS A REQUEST TO UTILIZE THE REAL-TIME APPLICATION

BACKGROUND OF THE INVENTION

1. Field of the Invention

This invention relates in general to a computer programming, and more particularly to a method, system and program storage device for preventing a real-time application from running out of free threads when the real-time application receives a device interface request.

2. Description of Related Art

In a highly competitive market environment, "time to market with superior quality" is the key focus in developing a new product. For a well-established development team with years of experience in software development, the reusability of existing software is the very key to achieving the goals of delivering a new product in the most efficient way with superior quality. Given the stiff competition in the market environment, what a new product is required to do is constantly increasing and how much it is allowed to cost is reducing. For a software product development, the demanding requirements and pressure of lowering cost are translated into the need for the reuse of existing software functions in various hardware platforms. One of the focus items to achieve high software reusability is to develop the software functions with the encapsulation of a platform they are operating upon. The platform includes the actual hardware and the operating systems.

One key consideration in selecting a platform for a product is whether the software can best perform in privileged mode or user mode. In contrast, kernel mode or privileged mode is the mode in which the operating system kernel runs. Code running in this mode has unlimited access to the system memory and external devices.

The traditional thinking is software can best perform in privileged mode. However, given the advancing technology in hardware platform development, operating in user mode may be a much better choice given different product requirements. The built-in protection provided by all modern operating systems for a software running in user mode, the ease of managing a program in a user mode, and the improved system stability with new software functions isolated from kernel are significant benefits of implementing a software project in user mode.

For a software product family to maintain high reusability across a range of products that may be operating in various platforms, a consistent device interface is a key for the software functions it provides to be invoked consistently. A software product consists of a set of key software components and software applications, which may be implemented as collaborating privileged and user mode applications to provide the functionality intended by the software product. In a user mode implementation of a real-time software application, the software product also provides a user mode device interface using socket interface.

For a real-time user application to run on a particular platform that has a relatively small run-time memory constraints, one design is to create a finite number of threads in a thread pool to handle all incoming device interface requests from other utility programs. The number of threads in a thread pool may be predetermined. Each device interface request to the real-time user application is handled by a thread in the pool that is free, i.e., not busy. Once a request is completed, the thread returns to the free thread pool waiting for the next incoming request.

However, the real-time application can run out of free threads upon the receipt of a new request because there are only a finite number of threads in the pool and because many utility programs can be making device interface requests to the real-time user application at the same time. A typical solution is to increase the number of the free threads in the pool. Unfortunately, the solution causes the real-time application to allocate/demand more from the limited total resource for a condition that is rarely reached. Another typical solution to the same problem is to return an error condition to a utility program to indicate it is temporarily unable to handle such request. A big issue with this error reporting approach is it would cause utility program to implement additional error handling for a temporary resource contention.

A better solution to this problem is needed so the real-time application does not keep increasing its allocation for resource to support more "free" threads and, at the same time, utility programs do not have to implement additional error handling for a temporary unavailability of threads to handle device interface requests.

There is a need for a method, system and program storage device for preventing a real-time application from running out of free threads when the real-time application receives a device interface request.

SUMMARY OF THE INVENTION

To overcome the limitations in the prior art described above, and to overcome other limitations that will become apparent upon reading and understanding the present specification, the present invention discloses a method, system and program storage device to implement an embedded retry mechanism at the device interface level to avoid error handling at the utility level and to avoid excess allocation of resource on an already constrained system The present invention solves the above-described problems by incorporating an embedded retry mechanism in the user mode interface. As an enhancement to the device interface, a set of special data packets for the main user application is provided. Shared functions are provided as part of the device interface to indicate the error condition when there is no more free thread and for a utility program to recognize a retry is needed. Thus, the retry mechanism is embedded in the shared functions running in both the main user application and all utility programs.

A user mode device interface according to an embodiment of the present invention includes a retry mechanism for generating a new retry response to a request initiated by a device open packet when a thread for processing the request is unavailable.

In another embodiment of the present invention, a computing system is provided. The computer system includes a processor having a user mode and a protected kernel mode and a memory, coupled to the processor, the memory including program code, executing in the processor, for providing a user mode device interface. The user mode device interface includes a retry mechanism for generating a retry response to a new request initiated by a device open packet when a thread for processing the request is unavailable.

In another embodiment of the present invention, a program storage device including program instructions executable by a processing device to perform operations for preventing a real-time application from running out of free threads when the real-time application receives a device interface request is provided. The operations include generating, by a utility program, a device request by calling a shared function, sending, to a main user application, a device open data packet making a device request, searching for a free thread at the main user application, determining whether a free thread is available and sending a retry needed packet to the utility program when a free thread is unavailable.

In another embodiment of the present invention, a method for preventing a real-time application from running out of free threads when the real-time application receives a device interface request is provided. The method includes generating, by a utility program, a device request by calling a shared function, sending, to a main user application, a device open data packet making a device request, searching for a free thread at the main user application, determining whether a free thread is available and sending a retry needed packet to the utility program when a free thread is unavailable.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, system and program storage device for preventing a real-time application from running out of free threads when the real-time application receives a device interface request. A set of special data packets for the main user application is provided. Shared functions are provided as part of the device interface to indicate the error condition when there is no more free thread and for a utility program to recognize a retry is needed. Thus, the retry mechanism is embedded in the shared functions running on both the main user application and all utility programs.

Figure 1:
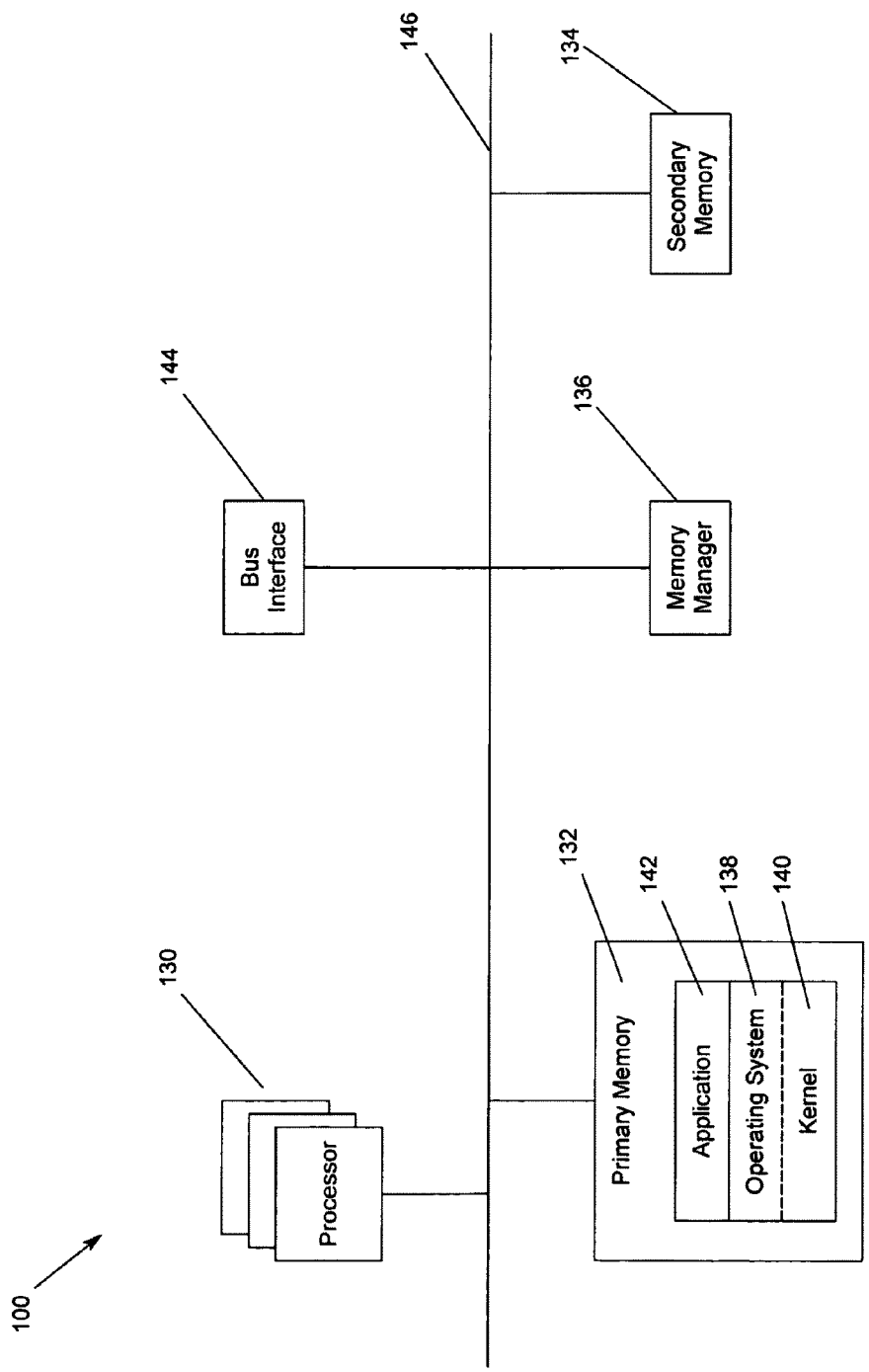
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
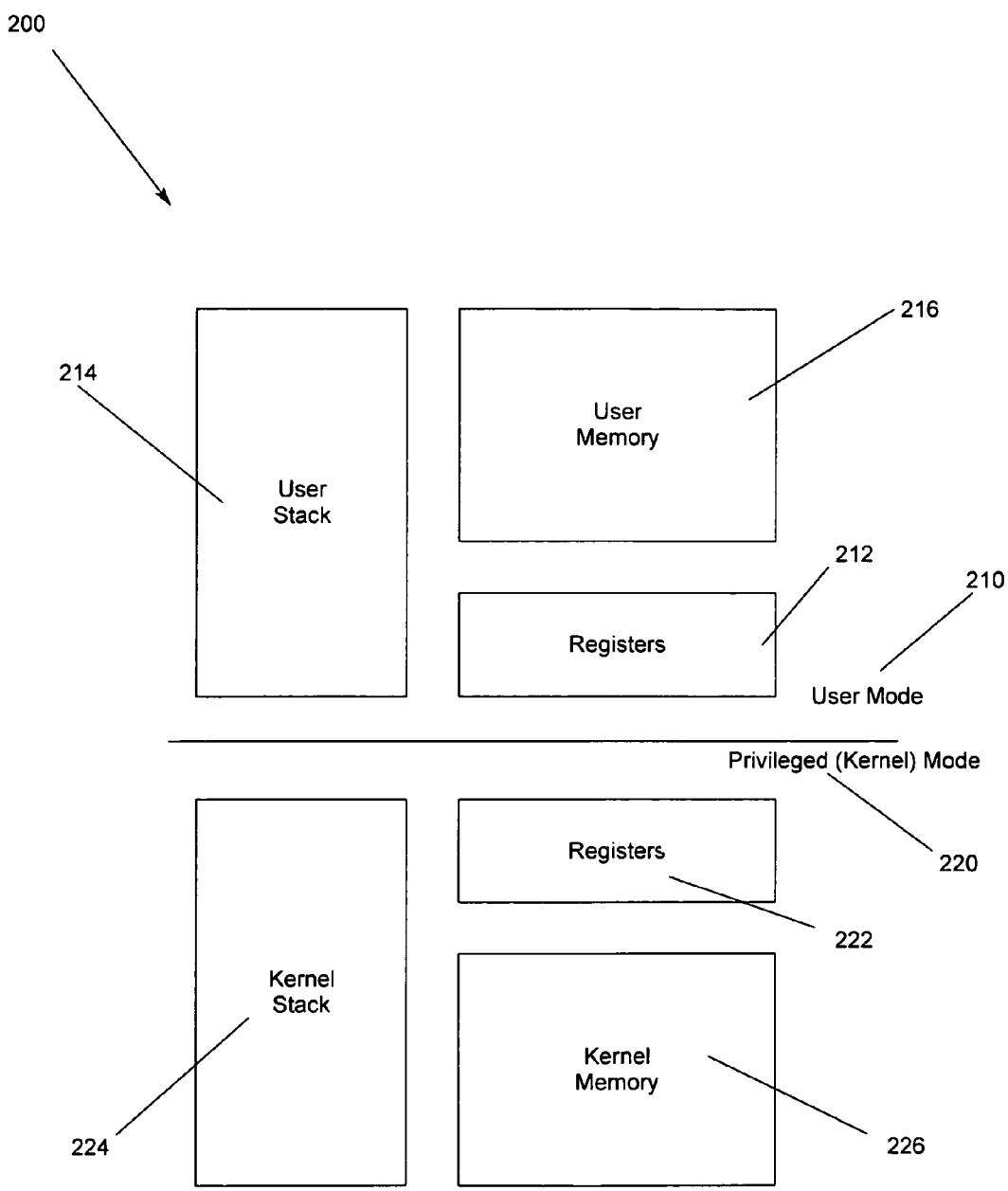
FIG. 2 shows the user mode and kernel mode states according to an embodiment of the present invention.

FIG. 2 shows the user mode and kernel mode states 200 according to an embodiment of the present invention. In FIG. 2, a user mode 210 and kernel mode 220 are shown. Applications and subsystems run on the computer in user mode 210. Processes that run in user mode 210 do so within their own virtual address spaces. They are restricted from gaining direct access to many parts of the system, including system hardware, memory not allocated for user mode 210, and other portions of the system that might compromise system integrity.

Processes that run in kernel mode 220 can directly access system data and hardware, and are not restricted like processes running in user mode 210. Performance-sensitive drivers and services run in kernel mode 220 to interact with hardware more efficiently. All components for processes running in kernel mode 220 are fully protected from applications running in user mode 210. Processes that run in user mode 210 are effectively isolated from processes running in kernel mode 220 and other processes running in user mode 210.

In FIG. 2, a thread for a process running in user mode 210 is characterized as having its own context including registers 212 and user stack 214. A user stack 214 is a data structure that includes a series of memory locations and a pointer to the initial location. All processors provide instructions for placing and retrieving values to and from the user stack 214. The user memory 216 is a block of memory that is dedicated to the use of a current process running in user mode 210. A complete user state of a thread is maintained in user registers 212.

The kernel operates in its own protected address space and includes its own registers 222 and kernel stack 224. The kernel maintains the integrity of its own data structures and that of other processes. The kernel stack 224 includes information used by the kernel. Kernel memory 226 is generally shared by all processes, but is only accessible in kernel mode 220. Context switches from one task to another happen on the kernel stack 224 of the current process.

Figure 3:
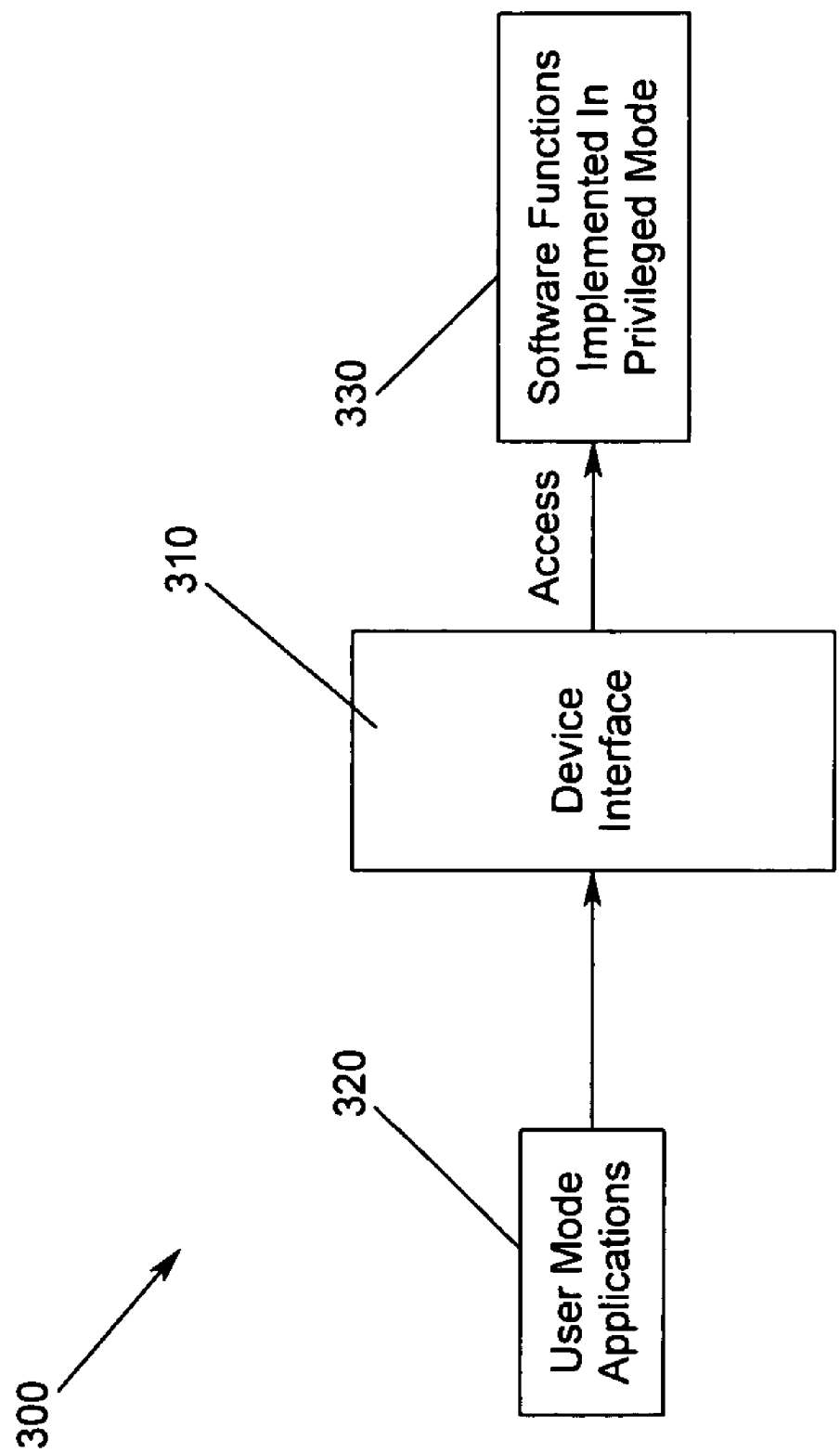
FIG. 3 illustrates an architecture of a computer system.

FIG. 3 illustrates an architecture of a computer system 300. In FIG. 3, a device interface 310 is shown disposed between user mode applications 320 and software functions running in privileged mode 330 (e.g., kernel mode). The device interface 310 provides an interface for all applications running in user mode 320 to access software functions implemented in privileged mode 330. However, the device interface 310 is not available to invoke these same software functions if they are to be modified to run in user mode.

Figure 4:
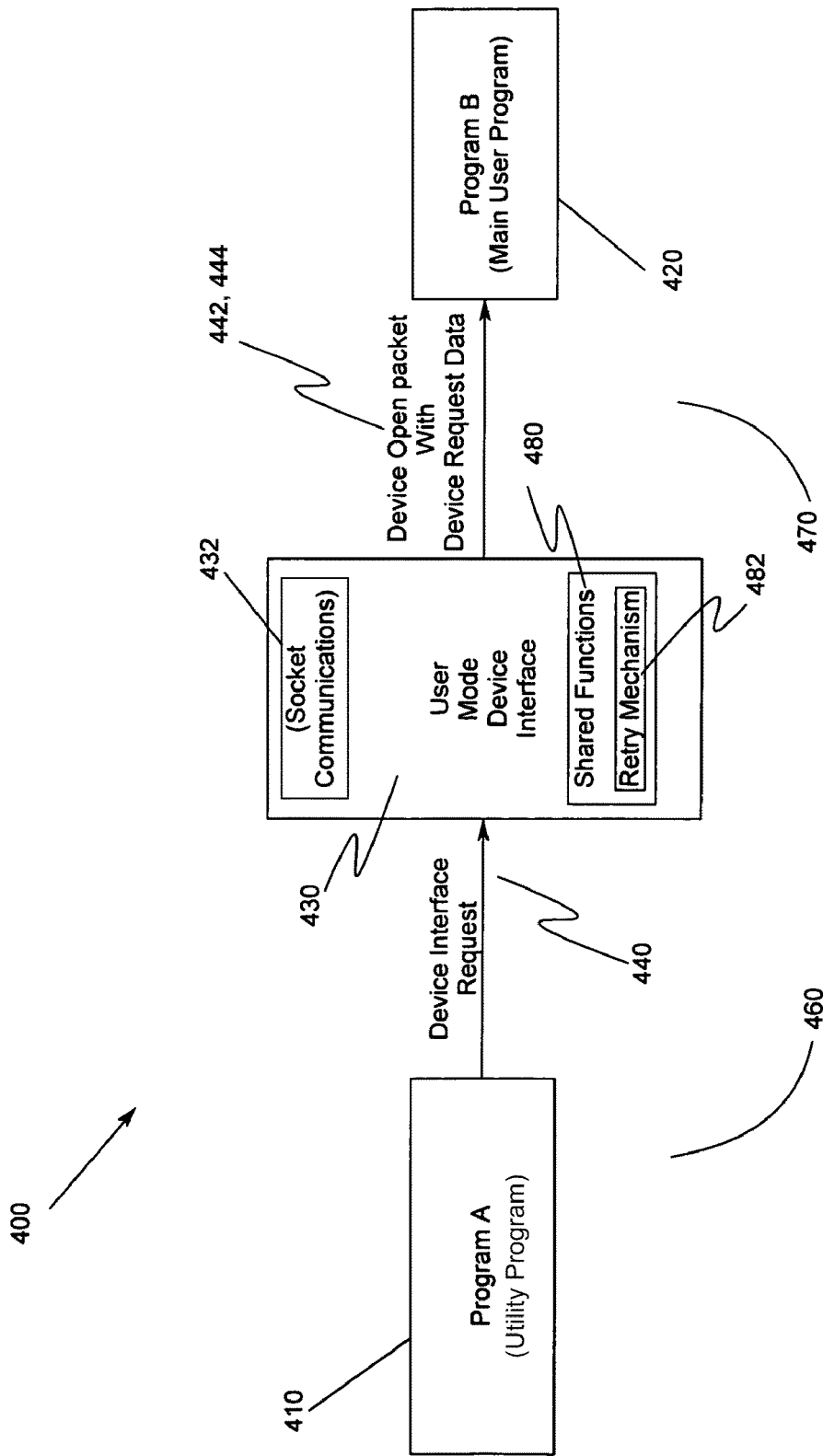
FIG. 4 is a diagram showing operation of user mode device interface according to an embodiment of the present invention.

FIG. 4 is a diagram showing operation of user mode device interface 400 according to an embodiment of the present invention. In FIG. 4, user mode device interface 430 provides a socket communication path between processes of a first application 410 running on the client side 460 in a user mode and a main user application 420 running on the server side 470 in privileged mode. The user mode device interface 430 allows device interface requests 440 to be sent and received, including commands 442 and data structures 444, via socket communication 432. The client side 460 of the user mode device interface 430 simply connects to the server side 470 to send and receive data, i.e., send requests for trace data and receive trace data. The server side 470 of the user mode device interface 430 accepts incoming connections.

As shown in FIG. 4, the first application 410 wants to use software functions of the second application 420, i.e., the main user application 420. According to an embodiment of the present invention, the user mode device interface 430 enables software functions of the main user application 420 to be reused and re-implemented. The user mode device interface 430 provides a consistent interface to invoke the functions of the main user application 420. The user mode device interface 430 provides an embedded retry mechanism 482 as an enhancement to the device interface. The retry mechanism 482 introduces a set of special data packets for the main user application 420 to indicate the error condition when there a free thread is unavailable and for the first application 410 to recognize that a retry is needed. Because there is a set of shared functions 480 provided as part of the device interface 430, the retry mechanism 482 is embedded in the shared functions 480 running on both the main user application 420 and the first application 410.

When the first application 410 makes a request 440 to the main user program 420, the first application 410 has to call one of the shared functions 480 to make such a request. A device open data packet 442 is sent to the main user program 420. The main user program 420 then looks for a free thread for processing the request. If a free thread is not available, a retry needed packet is returned to the first application 410. The retry is completely transparent to the first application 410 when it is in progress, which means the first application 410 does not have to worry about implementing any error handling.

The utility program 410 merely experiences a longer delay to the completion of a request while a retry is in progress. The delay does not cause a problem because the device interface 430 is always expected to be a synchronous interface, i.e., a utility program making a request has to wait for the completion of a request before it can proceed with its own processing.

Figure 5:
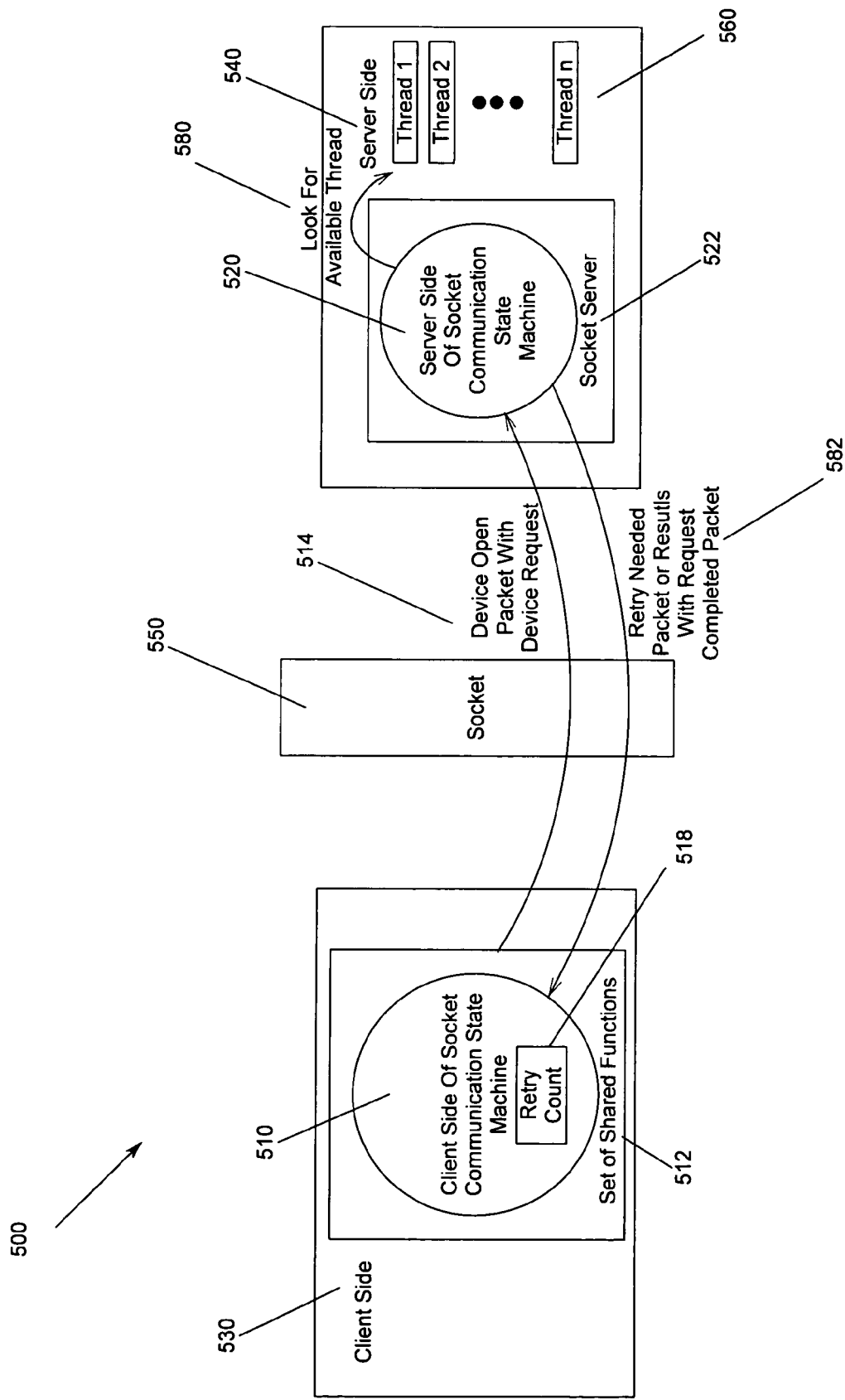
FIG. 5 illustrates interactions between a client side, a server side and a user device interface according to an embodiment of the present invention.

FIG. 5 illustrates interactions 500 between a client side, a server side and a user device interface according to an embodiment of the present invention. Above the physical socket interface for receiving and sending requests as shown in FIG. 4, there is the logical device interface state machine. In FIG. 5, the user mode device interface includes device state machines 510, 520 that are implemented on both client 530 and server 540 sides of the socket 550 to satisfy device interface requirements. In FIG. 5, a device state machine on the client (requester making requests) side 530 is implemented in a set of shared functions 512 that can be incorporated by all applications that want to communicate to a particular user program on the server side 540. The server side 540 offers the software functions over a user mode device interface via socket communication 550. The device state machine on the server side 540 is embedded in the socket server implementation 522. The interaction between the state machines 510, 520 on both client 530 and server 540 sides ensures a device interface request is properly handled.

In FIG. 5, when utility program on the client side 530 makes a request to a main user application on the server side 540, a shared function is called. A Device Open data packet 514 is first sent to the server side 540, which signals the server side that a device interface request has been received. In response to receipt of the device open packet 514, the server side of socket communication state machine 520 looks for available threads 580. When the server side of socket communication state machine 520 finds all available threads 580 are currently busy handling request, the server side of socket communication state machine 520 responds to the device open packet with a retry needed data packet 582. If a thread is available, the server side of socket communication state machine 520 returns the results with a request completed packet 582.

When a retry needed packet is received, the client side of socket communication state machine 510 suspends the process for a period time. Since the shared function, at this point, is still running in the context of a utility program making a request to the server side of socket communication state machine 520, the client side of socket communication state machine 510 has all the information it needs to retry the same device request. Once the sleep time expires, the shared function 512 retries the same device open again to the server side of socket communication state machine 520 and only proceeds when a request completed packet 582 is received. The client side of socket communication state machine 510 includes a retry count 518 to prevent infinite retry attempts. Once a maximum number of attempts to retry the device open has been executed, the next "retry needed packet" from the server side of socket communication state machine 520 causes the shared function to surface the error back to the utility program. On the server side of socket communication state machine 520, there is no need to keep track of what request is being retried. Once a retry needed response is sent back to a utility program, the server side of socket communication state machine 520 considers it as a completion to handle such a request and simply tells the client to try again later.

Figure 6:
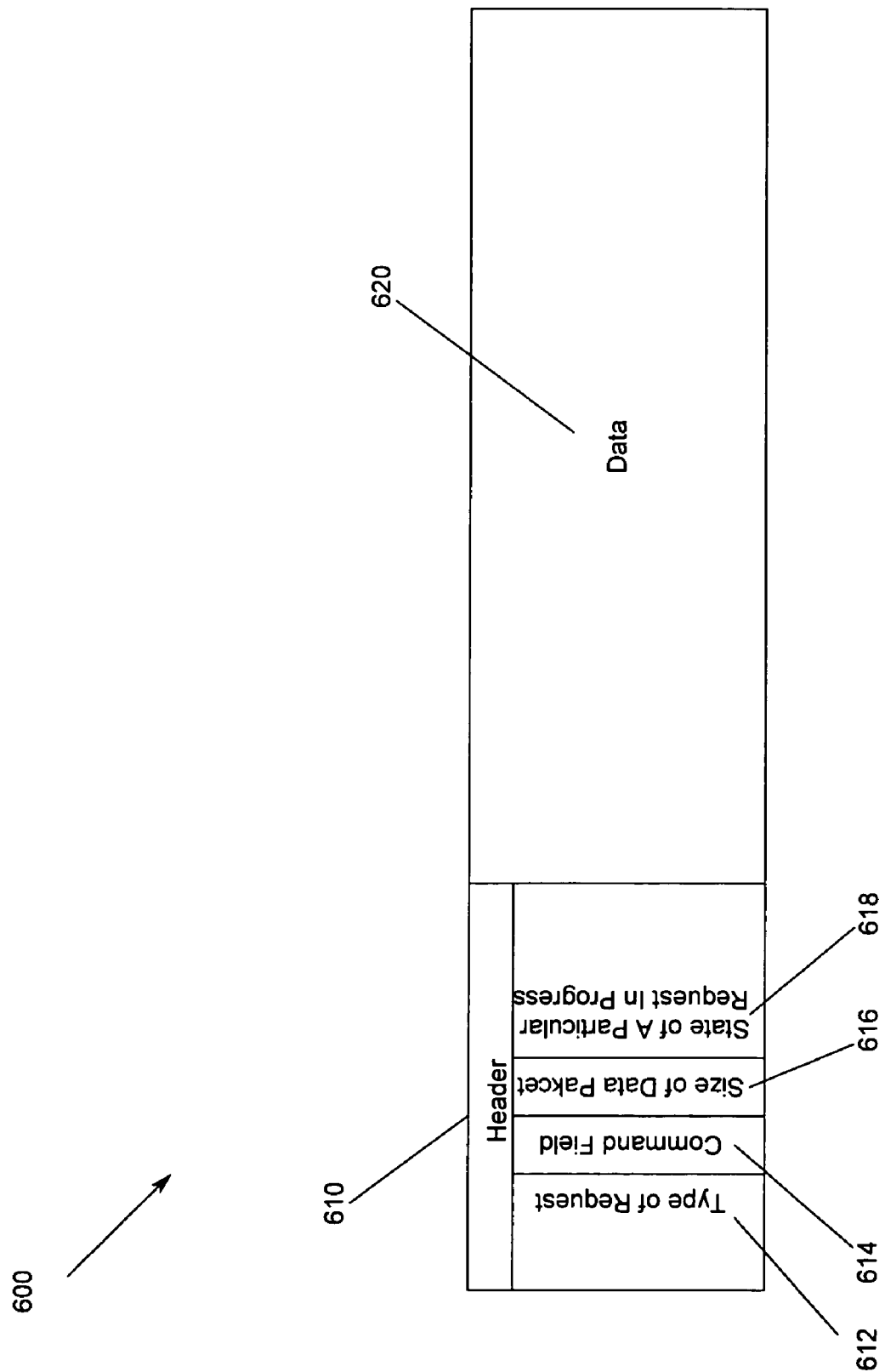
FIG. 6 illustrates a data packet structure for a user device request packet according to an embodiment of the present invention.

FIG. 6 illustrates a data packet structure 600 for handling each request/response according to an embodiment of the present invention. In order to implement the device interface state machine over the socket interface, various data packets with special meanings need to be communicated between the main real-time user application and a utility program before actual request data is sent. As shown in FIG. 6, a data packet 600 for communicating over the socket interface in order to conduct a device interface request to a user program is shown. The data packet 600 includes a header structure 610 and may include data 620. The header structure 610 specifies a type of request 612, a command field 614, the size of a data packet 616, and the state of a particular request in progress 618.

Figure 7:
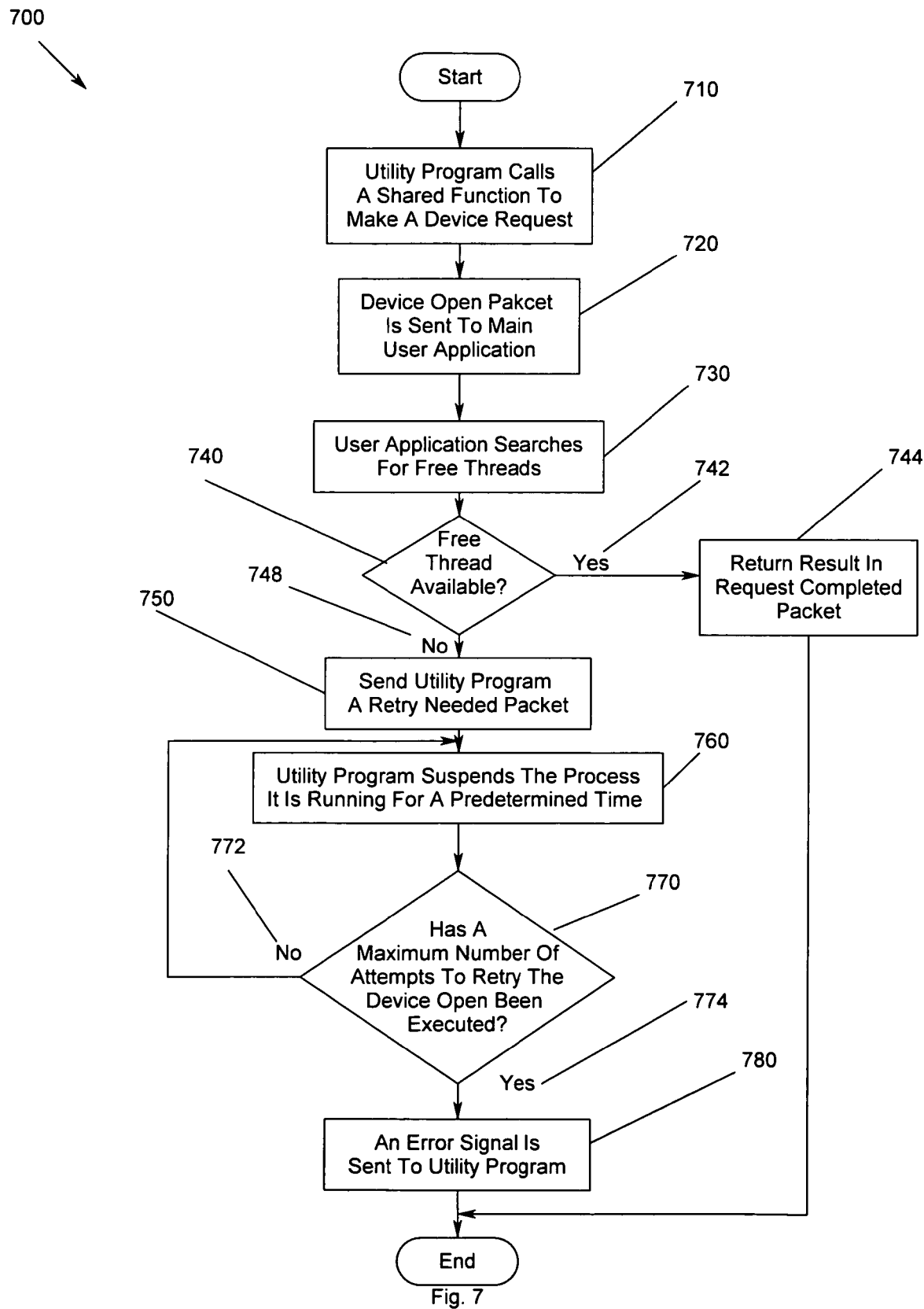
FIG. 7 is a flow diagram of a method for preventing a real-time application from running out of free threads when the real-time application receives a device interface request according to an embodiment of the present invention.

FIG. 7 is a flow diagram 700 of a method for preventing a real-time application from running out of free threads when the real-time application receives a device interface request according to an embodiment of the present invention. A utility program makes a device request by calling one of the shared functions 710. A device open data packet is sent to the main user application 720. The user application looks for a free thread 730. A determination is made whether a free thread is available 740. If a free thread is available 742, the result is returned in a request completed packet 744. When the main user application finds all threads are currently busy handling request 748, the main user program responds to the device open packet with a retry needed data packet 750. When a retry needed packet is received, the utility program suspends the process it is running for a predetermined period of time 760. A determination is made whether a maximum number of attempts to retry the device open have been executed 770. If a maximum number of attempts to retry the device open have not been executed 772, the shared function sends the same device open again to the main user application to retry the device request. If the maximum number of attempts to retry the device open has been executed 774, an error signal is sent to the utility program 780.

Figure 8:
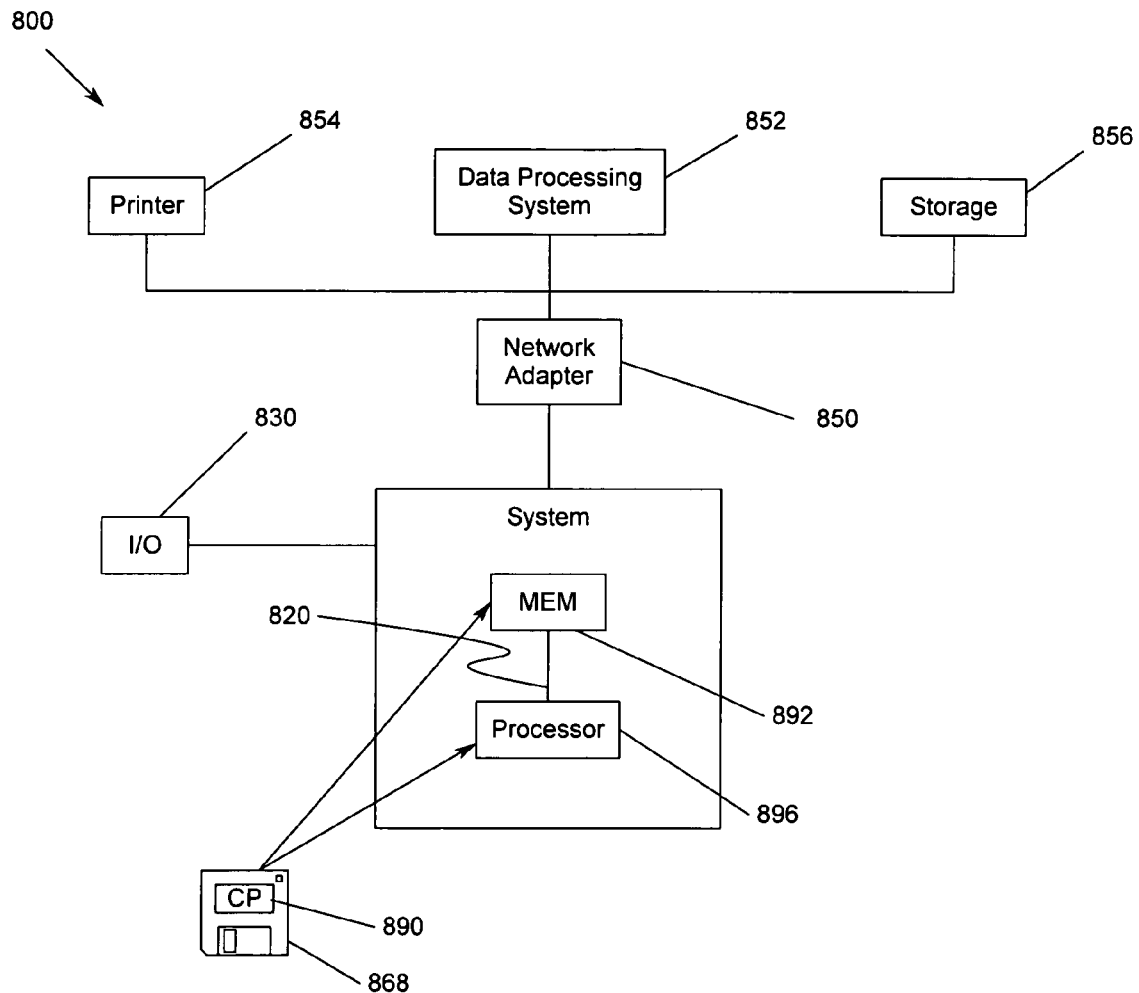
FIG. 8 illustrates a system according to an embodiment of the present invention.

FIG. 8 illustrates a system 800 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 890 accessible from a computer-usable or computer-readable medium 868 providing program code for use by or in connection with a computer or any instruction execution system.

For the purposes of this description, a computer-usable or computer readable medium 868 can be any apparatus that can contain, store, communicate, propagate, or transport the program for use by or in connection with the instruction execution system, apparatus, or device. The medium 868 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 896 coupled directly or indirectly to memory elements 892 through a system bus 820. The memory elements 892 can include local memory employed during actual execution of the program code, bulk storage, and cache memories which provide temporary storage of at least some program code in order to reduce the number of times code must be retrieved from bulk storage during execution.

Input/output or I/O devices 830 (including but not limited to keyboards, displays, pointing devices, etc.) can be coupled to the system either directly to the system or through intervening I/O controllers.

Network adapters 850 may also be coupled to the system to enable the system to become coupled to other data processing systems 852, remote printers 854 or storage devices 856 through intervening private or public networks (not shown). Modems, cable modem and Ethernet cards are just a few of the currently available types of network adapters.

Accordingly, the computer program 890 comprise instructions which, when read and executed by the system 800 of FIG. 8, causes the system 800 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computing system, comprising:
a processor including a user mode and a kernel mode; and
a memory coupled to the processor, the memory storing a user mode device interface between the user mode and the kernel mode, the user mode device interface providing a socket communication path between a first process operating in the user mode and a second process operating in the kernel mode, the user mode device interface comprising a retry mechanism for generating a retry message when a thread in the second process is unavailable for processing a request to utilize the second process, wherein:
the user mode device interface provides a set of shared functions to the first process and the second process,
the retry mechanism is embedded in the set of shared functions in the user interface and runs on the first process in the user mode and on the second process in the kernel mode such that the retry mechanism is transparent to the first process,
the retry mechanism introduces a set of special data packets that causes the second process to indicate an error condition and transmit a retry needed packet to the first process when the second process determines that a flee thread is not available,
the retry needed packet causes the first process to wait for a predetermined period of time and to retry the request at a later time instead of implementing any error handling,
the request is transmitted from the first process to the second process,
the request is transmitted as a device open packet, and
the device open packet and the retry message are transmitted between the first process and the second process via the socket communication path.

2. The computing system of claim 1, further comprising: a user side object for generating requests for use of software functions running on a main user application in the kernel mode; and a server side object for performing the request, wherein the user side object and the server side object provide a logical device interface state machine for controlling the retry mechanism.

3. The computing system of claim 1, wherein the retry mechanism includes a retry count for prevention of an infinite number of retry attempts.

4. A computing system, comprising:
a processor including a user mode and a protected kernel mode; and
a memory coupled to the processor, the memory including program code configured to execute in the processor, the program code structure to provide a user mode device interface between the user mode and the protect kernel mode, the user mode device interface configured to provide a socket communication path between a first process operating in the user mode and a second process operating in the protected kernel mode, the user mode device interface including a retry mechanism for generating a retry message when every thread in a plurality of threads in the second process is unavailable for processing a request to utilize the second process, wherein:
the request is transmitted from the first process to the second process,
the request is transmitted as a device open packet,
the user mode device interface provides a set of shared functions to the first process and the second process,
the retry mechanism is embedded in the set of shared functions in the user interface and runs on the first process in the user mode and on the second process in the kernel mode such that the retry mechanism is transparent to the first process,
the retry mechanism introduces a set of special data packets that causes the second process to indicate an error condition and transmit a retry needed packet to the first process when the second process determines that a free thread is not available,
the retry needed packet causes the first process to wait for a predetermined period of time and to retry the request at a later time instead of implementing any error handling, and
the device open packet and the retry message are transmitted between the first process and the second process via the socket communication path.

5. The computing system of claim 4 further comprising a user side object for generating requests for use of software functions running on a main user application and a server side object for performing the request, wherein the user side object and the server side object provide a logical device interface state machine for controlling the retry mechanism.

6. The computing system of claim 4, wherein the retry mechanism includes a retry count for prevention of an infinite number of retry attempts.

7. A program storage device, comprising:
program instructions executable by a processing device to perform operations for preventing a first application operating in a protected kernel mode from running out of free threads when the first application receives a device interface request from a second application operating in a user mode, the operations comprising:
generating, by a utility program running in the second application, a device request by calling a shared function;
transmitting, to a main user application running in the first application, a device open data packet making a device request, the device open data packet transmitted via a socket communication path provided by a user mode device interface between the user mode and the protected kernel mode;
searching for a free thread at the main user application;
determining whether a free thread is available; and
sending a retry needed packet, via the socket communication path, to the utility program when a free thread is unavailable, wherein:
the user mode device interface provides a set of shared functions to the first application and the second application,
the retry mechanism is embedded in the set of shared functions in the user interface and runs on the second application in the user mode and on the first application in the kernel mode such that the retry mechanism is transparent to the second application,
the retry mechanism introduces a set of special data packets that causes the first application to indicate an error condition and transmit a retry needed packet to the second application when the first application determines that a free thread is not available,
the retry needed packet causes the second application to wait for a predetermined period of time and to retry the request at a later time instead of implementing any error handling.

8. The program storage device of claim 7 further comprising returning results to the device request in a request completed packet when a free thread for processing the request is available.

9. The program storage device of claim 7 further comprising placing processing running at the utility program to sleep for a predetermined period of time when the utility program receives a retry needed packet in response to the device request.

10. The program storage device of claim 9 further comprising sending an error signal to the utility program when the retry count maximum is reached.

11. The program storage device of claim 9 further comprising retrying the device request after a predetermined period of time after receiving the retry needed packet from the main user application.

12. A method for preventing a real-time application from running out of free threads when the real-time application operating in a protected kernel mode receives a device interface request from an application operating in a user mode, the method comprising:
generating, by a processor, a device request by calling a shared function;
sending, to a main user application by the processor, a device open data packet making a device request, the device open data packet transmitted via a socket communication path provided by a user mode device interface between the user mode and the protected kernel mode;
searching for a free thread at the main user application;
determining whether a free thread is available; and
sending a retry needed packet, via the socket communication path, to the utility program when a free thread is unavailable, wherein:
the user mode device interface provides a set of shared functions to the first application and the second application,
the retry mechanism is embedded in the set of shared functions in the user interface and runs on the second application in the user mode and on the first application in the kernel mode such that the retry mechanism is transparent to the second application,
the retry mechanism introduces a set of special data packets that causes the first application to indicate an error condition and transmit a retry needed packet to the second application when the first application determines that a free thread is not available,
the retry needed packet causes the second application to wait for a predetermined period of time and to retry the request at a later time instead of implementing any error handling.

* * * * *